(12) United States Patent
Öcal et al.

(10) Patent No.: US 11,230,166 B2
(45) Date of Patent: Jan. 25, 2022

(54) DISPLAY UNIT WITH INTEGRATED MEANS FOR AIR FLOW DEFLECTION (71) Applicant: Vestel Elektronik Sanayi ve Ticaret A. S., Manisa (TR)

(72) Inventors: Ömür Öcal, Manisa (TR); Barbaros Kirisken, Manisa (TR)

(73) Assignee: VESTEL ELEKTRONIK SANAY VE TICARET A.S., Manisa (TR)

( * ) Notice: Subject to any disclaimer, the term of this patent is extended or adjusted under 35 U.S.C. 154(b) by 285 days.

(21) Appl. No.: 16/315,627

(22) PCT Filed: Jun. 7, 2017

(86) PCT No.: PCT/EP2017/063793
§ 371 (c)(1),
(2) Date: Jan. 4, 2019

(87) PCT Pub. No.: WO2018/010895
PCT Pub. Date: Jan. 18, 2018

(65) Prior Publication Data
US 2019/0299745 A1 Oct. 3, 2019

(30) Foreign Application Priority Data
Jul. 14, 2016 (EP) .................................... 16179577

(51) Int. Cl.
*B60H 1/00* (2006.01)
*B60H 1/24* (2006.01)
*B60H 1/34* (2006.01)

(52) U.S. Cl.
CPC ......... *B60H 1/00985* (2013.01); *B60H 1/242* (2013.01); *B60H 1/3414* (2013.01); *B60K 2370/1438* (2019.05); *B60K 2370/658* (2019.05)

(58) Field of Classification Search
CPC ...... B60K 2370/1438; B60K 2370/658; B60H 1/3414; B60H 1/242; B60H 1/3407; B60H 1/00985
See application file for complete search history.

(56) References Cited

U.S. PATENT DOCUMENTS

2009/0210110 A1* 8/2009 Dybalski ................ B60K 37/06
701/31.4
2010/0327070 A1* 12/2010 Bouchard .......... B60H 1/00985
236/49.3
(Continued)

FOREIGN PATENT DOCUMENTS

CN 204348336 U * 5/2015
DE 100 43 623 3/2002
(Continued)

OTHER PUBLICATIONS

Chen, CN 204348336 U English machine translation, May 20, 2015 (Year: 2015).*
(Continued)

*Primary Examiner* — Edelmira Bosques
*Assistant Examiner* — Phillip Decker
(74) *Attorney, Agent, or Firm* — McDonnell Boehnen Hulbert & Berghoff LLP (57) ABSTRACT

The present invention refers to a display unit. The display unit comprises at least a screen (105) for displaying visual information and an air conducting means (102) for conducting air from a source to the screen (105), wherein the conducting means (102) is configured to direct the air at least sectionaly along the screen (105), characterized by at least one deflection means (104) having a deflection surface for deflecting at least one part of the air directed at least sectionaly along the screen (105).

13 Claims, 8 Drawing Sheets

(56) References Cited

U.S. PATENT DOCUMENTS

| | | | | |
|---|---|---|---|---|
| 2013/0044100 A1* | 2/2013 | King | ...................... | G09G 3/003 |
| | | | | 345/419 |
| 2016/0311293 A1* | 10/2016 | Wunderlich | ....... | B60H 1/00821 |
| 2018/0004339 A1* | 1/2018 | Kulkarni | ............. | G06F 3/04883 |

FOREIGN PATENT DOCUMENTS

| | | | | | |
|---|---|---|---|---|---|
| DE | | 10043623 | A1 * | 3/2002 | ............ B60K 35/00 |
| DE | 10 2014 011119 | | | 1/2016 | |
| EP | | 3037740 | A1 * | 6/2016 | ............ F24F 11/30 |
| JP | | 05042854 | A  * | 2/1993 | |

OTHER PUBLICATIONS

Kazama, JP 5-42854 A English machine translation, Feb. 23, 1993 (Year: 1993).*

The International Search Report (ISR) for PCT/EP2017/063793 dated Sep. 20, 2017, pp. 1-3.

Written Opinion of the International Searching Authority for PCT/EP2017/063793 dated Sep. 20, 2017, pp. 1-6.

* cited by examiner

DISPLAY UNIT WITH INTEGRATED MEANS FOR AIR FLOW DEFLECTION

CROSS-REFERENCE TO RELATED APPLICATIONS

This application claims the benefit of the filing date of international PCT Application No. PCT/EP2017/063793, filed on Jun. 7, 2017 that in turn claims priority to European Patent Application No. EP 16 179 577.8, filed on Jul. 14, 2016, which are hereby incorporated by reference in their entirety.

The present invention refers to a display unit according to claim 1, a dashboard according to claim 11, a vehicle according to claim 12 and a method according to claim 13.

BACKGROUND OF THE INVENTION

Venting systems e.g. in vehicles are required to heat up or to chill the space inside the vehicle dependent on the needs of the user. Since more and more vehicle are equipped with screens for displaying information in the middle of the dashboard the space for the venting systems is occupied by such screens. Thus, a sufficient venting is not possible any more.

OBJECT OF THE INVENTION

It is an object of the present invention to provide a display unit, a dashboard, a vehicle and a method for enhanced venting of air, in particular in areas with limited space.

DESCRIPTION OF THE INVENTION

The object of the invention is solved by a display unit according to claim 1. The inventive display unit preferably at least comprises a screen for displaying visual information and an air conducting means for conducting air from a source to the screen.

The conducting means is preferably configured to direct the air at least sectionaly along the screen surface. According to the invention at least one deflection means is generated, arranged, provided, caused or formed, wherein the deflection means has a deflection surface for deflecting at least one part of the air directed at least sectionaly along the screen.

This solution is beneficial since the air flow can be redirected respectively deflected in a region that is used to visualize information to a person, in particular a user. Furthermore, the air flow removes dust or similar particles from the screen surface, thus the overall appearance of the screen device is improved.

Advantageous embodiments may be configured according to any claim and/or the following specification parts.

According to a further preferred embodiment of the present invention a deformation means is arranged underneath a section of the screen surface for transferring a part of the screen between a deflection state and a non-deflection state, wherein the deflection means is formable by a deformation of the screen surface caused by the deformation means, wherein at least one part of the screen surface forms as the deflection means with the deflection surface a peak in the deflection state and wherein in the non-deflection state the deformation of the screen surface is less, in particular that one part of the screen is flat, compared with the deflection state. The deformation means can be designed in such a manner that deformations of the screen respectively deflection means can be caused in a screen surface section having at least 10% of the screen size or 20% of the screen size or 30% of the screen size or 40% of the screen size or 50% of the screen size or 60% of the screen size or 70% of the screen size or 80% of the screen size or 90% of the screen size or 95% of the screen size or 10% of the screen size or 99% of the screen size.

An air flow adjustment means for adjusting the air flow parameter, in particular the flow speed, the flow direction and/or the flow temperature is provided according to a further preferred embodiment. The deformation means preferably forms the size and/or shape and/or location of the deflection means in dependency of a signal corresponding to the adjustment. Alternatively the deformation means is preferably actuatable by a deflection adjustment means for setting up or changing the size and/or shape and/or location of the deflection means independently from an adjustment carried out by the air flow adjustment means. This embodiment is beneficial since the comfort of the user can be increased in different ways.

The number of deflection means can be set up or changed by the air flow adjustment means or the deflection adjustment means according to a further preferred embodiment of the present invention. This embodiment is beneficial since due to different numbers of deflections means. Additionally or alternatively the deformation means comprises at least one microfluidic, wherein the microfluidic can be transferred, in particular by means of a pump unit, between at least two different locations, wherein a transfer of the microfluidic between said locations causes a change between the deflection state and the non-deflection state of at least one deflection means.

According to a further preferred embodiment of the present invention the screen is a touch screen, wherein the air flow adjustment means is at least visually displayable as a defined field on the touch screen and wherein adjustments can be made by inputting commands via that touch screen and/or wherein the deflection adjustment means is at least visually displayable as a defined field on the touch screen and wherein adjustments can be made by inputting commands via that touch screen. This embodiment is beneficial since a user sees information and is able to input commands with respect to the visualized information. The screen can be a touch screen or it can also be a non-touch screen.

The conducting means ejects the air flow according to a further preferred embodiment of the present invention in an angle lower than 30°, in particular lower than 15° or 10° or 5° or in parallel, with respect to the screen surface in the non-deflected state. This embodiment is beneficial since an air flow flowing in a small angle with respect to the screen surface can be deflected by the deflection means, thus individual venting schemes can be set up according to the preferences of the users. It is also conceivable that a control unit is provided. The control unit preferably stores venting schemes, thus a once stored venting scheme can be set up based on stored data. It is also conceivable that the venting schemes are storable with respect to a specific user or with respect to defined properties, like user properties (e.g. age and/or sex and/or height) and/or ambient conditions (temperature and/or humidity and/or atmospheric pressure).

The conducting means forms according to a further preferred embodiment of the present invention at least a slit or tube like output opening adjacent to the screen surface, wherein the screen surface defines a front side of the display unit, and/or wherein the conducting means also forms an input opening, wherein the input unit is arranged on a backside of the display unit, in particular adjacent to the backside of the display unit, wherein air is preferably conductable by the conducting means via the input opening and the output opening from the backside of the display unit to the front side of the display unit. The output opening of the conducting means has preferably the same height as the maximum height of the deformation means. It is alternatively possible that the output opening height is 10% or 20% or 30% or 40% or 50% higher or smaller than the maximum height of the deflection means. Preferably multiple deflection means are provided or formable. In case of multiple deflection means all deflection means can be preferably deflected to the same maximum height. In case the deflection means can be deflected to different heights an average maximum height results and the output opening of the conducting means has preferably the same height as the average maximum height of the deformation means. It is alternatively possible that the output opening height is 10% or 20% or 30% or 40% or 50% higher or smaller than the average maximum height of the deflection means.

Multiple output openings are arranged in the outer region of the screen surface and a corresponding number of deflection means are formable by the deformation means according to a further preferred embodiment of the present invention. This embodiment is beneficial since a complex venting respectively venting of multiple sections of the space adjacent to the front side of the screen can be carried out.

According to a further preferred embodiment of the present invention the screen surface is shaped in such a manner that the deflection means is materialized permanently independently of a state selected by an air flow adjustment means or the deflection means is reversely or non-reversely connected to the screen surface and/or the deflection means is at least transparent for light visible by humans, in particular light of wave lengths between 380 nm and 780 nm. This embodiment is beneficial since no deformation means must be provided, thus any screen can be modified to deflect air directed along the screen surface. Since no deformation means need to be provided the overall screen can be thinner and less complex, thus also cheaper.

The present invention also refers to a dashboard at least comprising a display unit according to any of the claims. Thus the present invention preferably refers to an air vent arrangement for car dashboards. Air is preferably injected from the frame of the screen, wherein the screen preferably belongs to a car infotainment system, and it is preferably conducted, in particular jetted, most preferred parallel to the surface of the screen. Over the screen preferably a microfluidic coating or glass is used, which preferably acts as a deformation means. To change the direction of airflow microfluidic surface is energized and one or more bumps, in particular transparent, are created, which is/are acting as deflection means. The angle and the size of the bumps respectively deflection means are preferably determined by electronic adjustment system preferably controlled by a control unit, and air flow through the driver and/or the passengers are adjusted according to size and shape of the bumps respectively deflection means and the speed of air flow. Air vents are the most critical parts for in car air conditioning and ventilation. Generally air vents are located on car dashboard (instrument panel) left/right and center. For infotainment screens up to 7" or 10" locating center air vents are not complicated. Many possible arrangements can be done for small infotainment screens. But recent in-car-infotainment systems or computers have very large screens up to 17" on the dashboard. So there is a significant problem to locate air vents with very large screens. There is no solution in the prior-art which gives hidden ventilation solution with similar features with conventional ones. Thus, the present invention is beneficial since the screen is used for redirecting respectively deflecting an air flow respectively the screen acts as integral part of the air vent. According to the invention the display unit can be placed respectively arranged in locations different to those of infotainment screens inside the center of the dashboard, it is also possible to locate the novel system at any place inside the car.

The present invention also refers to a vehicle, in particular a car, a train, a boat, a plane, at least comprising a dashboard according to claim 10 or a display unit according to any of claims 1 to 9.

It has to be understood that the display unit may also act as or controls a heating device and/or an air condition unit and that the air flow may consist of chilled or heated air.

The present invention also refers to a method for deflecting air. The inventive method preferably comprises at least the steps: Providing a display unit according to any of claims 1 to 9 or providing a dashboard according to claim 9 or providing a vehicle according to claim 10, causing air to be conducted by the conducting means and causing a deflections means to deflect at least one part of the conducted air.

According to a further preferred embodiment of the present invention a step of controlling the conducting means to direct the air to one of multiple sections of the screen surface can be executed and due to a further step the deformation means is caused to form at least one deflection means in the path of the air flow. These steps are beneficial since the deflection means are preferably provided in dependency of a prior adjustment of the air flow. Alternatively the deformation means is caused to form at least one deflection means controlling the conducting means to direct the air to the deflection means formed by the deformation means. This step is also beneficial since forming of a deflection means causes an adaption of the air flow to parameters of the deflection means. Such parameters can be e.g. the location and/or the shape and/or the height of the deflection means.

The step causing the formation and/or the shape and/or the position of one or more deflection means in dependency of commands inputted by means of the touch screen is a further preferred step according to the present invention. This step is beneficial since a touch screen is a wide spread unit with which many persons are familiar, thus this step helps to ease the usage of the device.

Forming multiple deflection means in the path of the air flow represents a further preferred step according to the present invention, wherein the deflection means are preferably shaped differently, in particular a second deflection means formed in the direction of the air flow behind a first deflection means extends higher than the first deflection means. This step is beneficial since due to the location and/or height and/or shape of the individual deflection means a large number of venting schemes can be set up.

The present invention further refers to a computer program product or a program code or system for executing one or more than one of the herein described methods.

Further benefits, goals and features of the present invention will be described by the following specification of the attached figures, in which exemplarily components of the invention are illustrated. Components of the devices and methods according to the inventions, which match at least essentially with respect to their function can be marked with the same reference sign, wherein such components do not have to be marked or described in all figures.

In the following the invention is just exemplarily described with respect to the attached figures.

BRIEF DESCRIPTION OF THE DRAWINGS

FIG. 8 shows a preferred configuration of the screen surface in case the air flow is stopped or the system is switched of;

FIG. 9 shows schematically a screen in a specific situation of usage;

Figure 1:
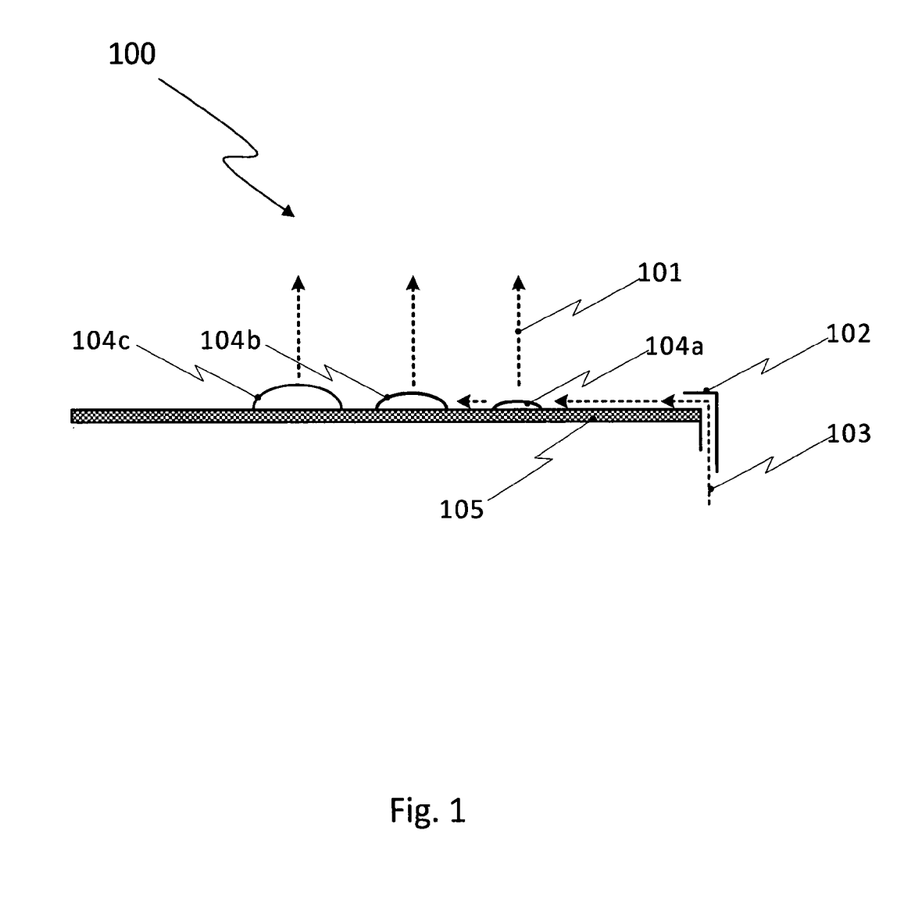
FIG. 1 shows a schematic illustration of the general concept of the present invention.

FIG. 1 shows a display unit 100. The display unit 100 comprises a screen, in particular an infotainment screen 105, and an air conducting means 102. Due to the air conducting means 102 air is conducted from a source or a first place through a frame and/or tube like arrangement (the conducting means) to the front side of screen 105. Preferably the air flow can be adjusted due to one or more parameters, in particular speed respectively throughput and/or temperature and/or output area. The adjustment is preferably carried out by or by means of the source. FIG. 1 further shows a plurality of deflection means 104a, 104b, 104c. The deflection means 104 can be arranged in any desired number and/or size and/or location. Thus, alternatively to the situation shown in FIG. 1 more or less than 3 deflection means 104 can be present. The conducting means preferably has one or multiple outputs for directing air to respectively along the screen surface. Each opening has preferably a size of only a few millimeters. In particular the size of the openings corresponds to the maximum size/height of the deflection means 104. According to a preferred embodiment the opening size/height is below the maximum size of a deflection means 104. The openings are preferably arranged by an elevated frame 102. The deflections means 104 are deflecting the air flowing along the screen according to reference number 101 into the cockpit. The deflection means 104 can be designed like the bumbs shown in FIGS. 12 and 13. Since a deformation means configured to deflect multiple surface portions of the screen at a time and/or in a row multiple "patterns" (specific arrangements of one or multiple deflection means) can be set up.

Figure 2:
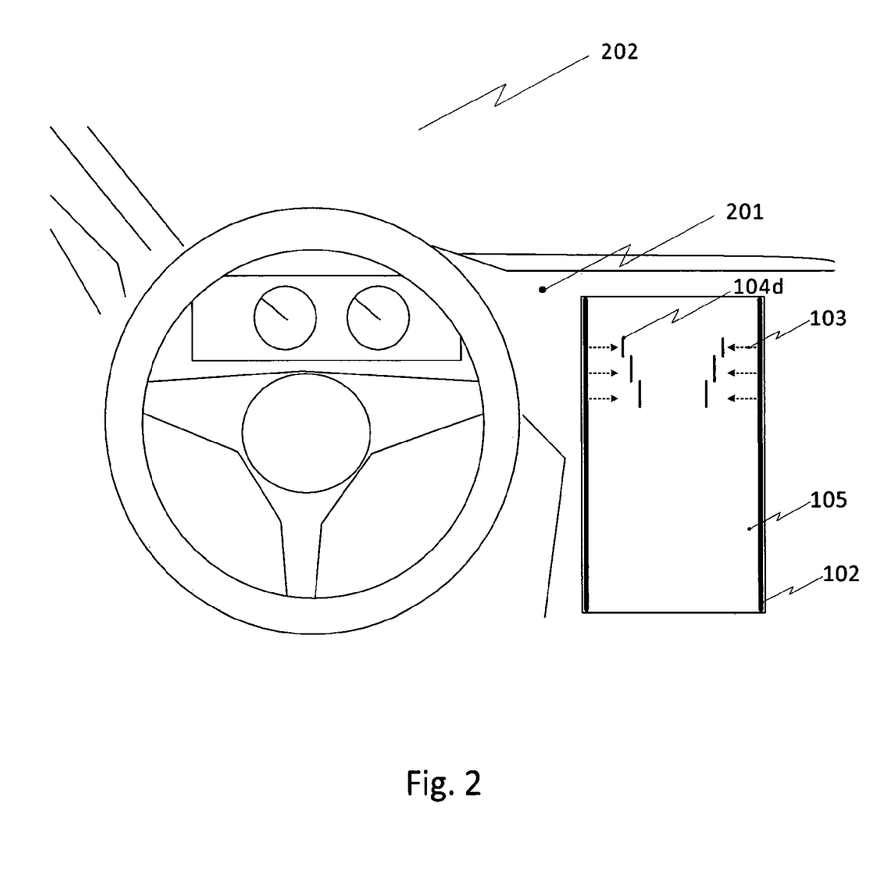
FIG. 2 shows a specific implementation of the present invention in a dashboard of a vehicle.

FIG. 2 shows a part of a vehicle. The dashboard 201 of vehicle comprises a screen 105 preferably larger than 7" or 10" or 13" or 15". The screen 105 is preferably arranged between one or more than one, in particular two, three or four, frame sections 102. The frame 102 can be configured in such a manner that air outlets are only provided in a defined field, thus e.g. only in a specific region of the screen venting can be carried out. Preferably, frame 102 comprises multiple outlets for directing air to most of the surface sections of the screen, in particular for directing air to more than 50% or to more than 75% or to more than 90% or to more than 99% of the surface sections. In such a case the conducting means can be adjusted in such a manner that only those sections are vented which match with a selected or set up venting. FIG. 2 further shows deflections means 104 arranged in locations having different distances to the frame 102. Thus, in this situation the top deflection means are deflecting the air on a path closer to the head of a driver or co-driver, wherein the lower deflections means are deflecting the air on a path further away to the head of a driver or co-driver respectively closer to the center of the car. According to the present invention preferably arbitrary combinations or arrangements of an arbitrary number of deflections means can be generated.

Figure 3:
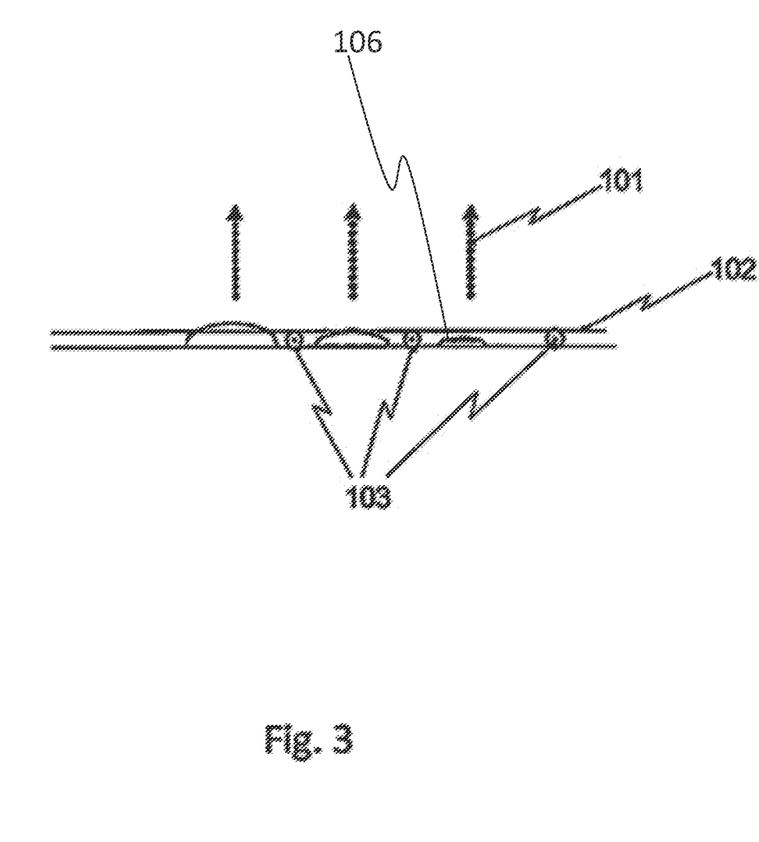
FIG. 3 shows a schematic side view of an example for arranging the components of the present invention.

FIG. 3 shows a schematic side view of the screen and the conducting means respectively the frame element 102. The frame element 102 provides multiple openings 103, in particular distributor orifices of preferably circular or slit like shape. Each opening is preferably fluidly coupled with the air source. Preferably are valves provided for selectively enabling or disabling air flow through one or multiple of those openings 103. The valves may also be configure to reduce the airflow through one, in particular a specific, or multiple, in particular multiple specific, openings. FIG. 3 further shows that the deflection means can be arranged or generated in or beneath or partly in the air flow passage.

Figure 4A:
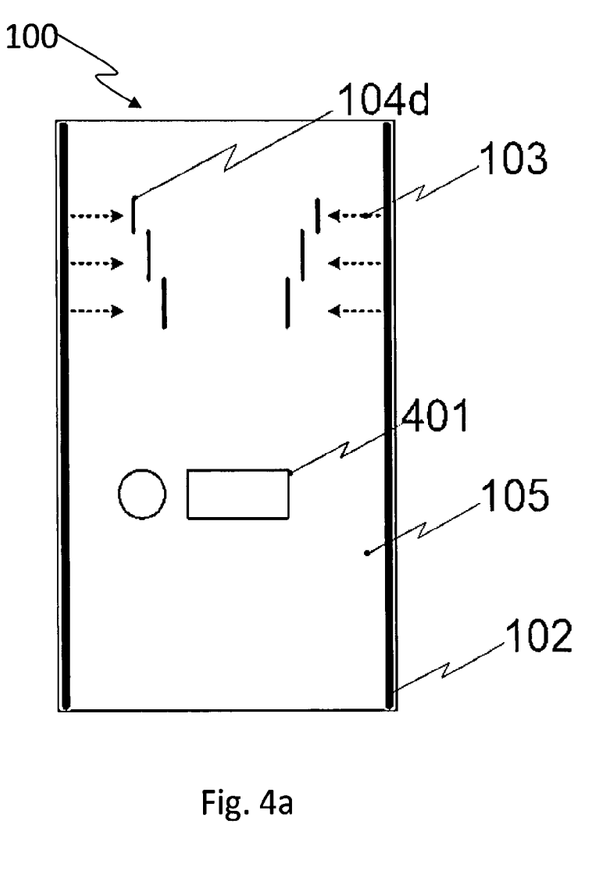
FIG. 4a shows a top view of a further schematic example of the present invention in a state of use.

FIG. 4a shows a display unit 100 similar to the one illustrated in FIG. 2. Reference number 401 indicates a field that can be visualized by the screen to allow a user to get informed about the present or future settings. Further, said field can be used to insert commands, in particular for adjusting the venting parameters, like temperature and/or air flow speed and/or air flow direction/s, in case the screen is a touch screen. Field 401 can be generated in any desired shape and size. Further, the position of that field can preferably be chosen arbitrarily.

Figure 4B:
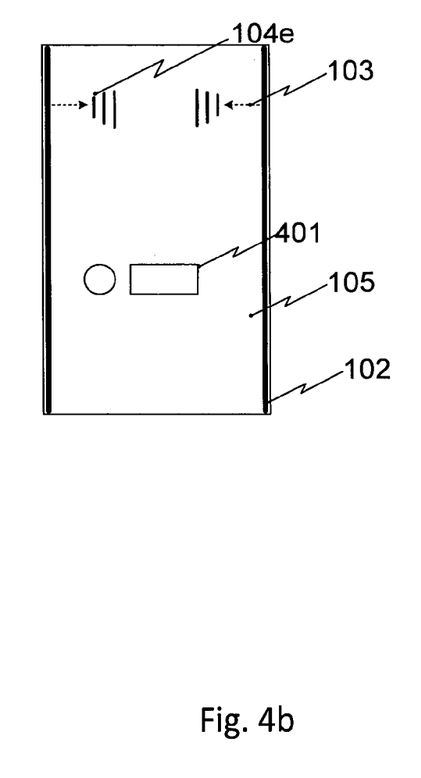
FIG. 4b shows a further top view of a further schematic example of the present invention in a state of use.

FIG. 4b shows that the deflection means 104 can be arranged in a setting according to reference number 104e. Thus, multiple deflection means 104 can be arranged besides or behind each other, in particularly in a row. The form or size of the individual deflection means 104 in such an arrangement (like 104e) can differ, wherein the size of the deflection means preferably increases the closer the individual deflection means 104 is arranged to the center of the screen 105.

Figure 5:
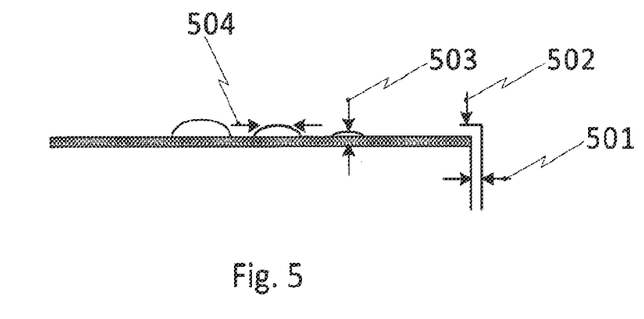
FIG. 5 schematically shows possibilities for varying the effect of the present invention.

FIG. 5 shows that the dimensions of the frame respectively openings 502 can be different or identical in various cases of use. Also the channels can be dimensioned with respect to the respective case of use. The same applies to the deformation means, so the width and/or height of individual or all deflection means can be set or adjusted. Thus, FIG. 5 demonstrates exemplary and most possible common adjustments, but is not limited thereto. Any other adjustments are also inside the scope of the invention.

Figure 6:
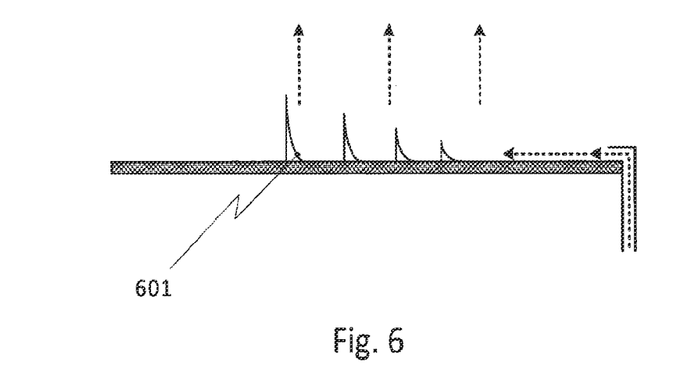
FIG. 6 shows examples for further shapes of the deflection means.

FIG. 6 demonstrates alternative shapes and alternative numbers of deflection means 601 respectively deflectors 601. In the exemplary case it is given a saw tooth shape and four deflectors. But any other number of deflectors are possible. The deflection means 601 of FIG. 6 can be generated by means of microfluidic elements or can be attached as a whole or individually to the screen surface.

Figure 7:
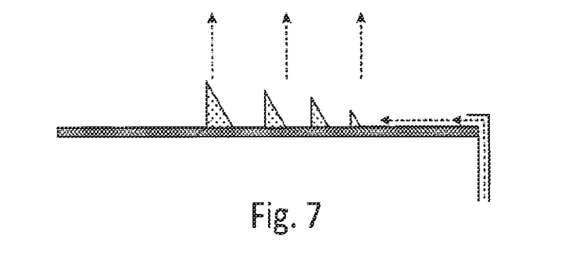
FIG. 7 shows examples for further shapes of the deflection means.

FIG. 7 shows an embodiment, according to that fixed deflections means, in particular transparent deflector bumps, in particularly made from plastic, like Plexiglas, or from glass, are attached or are attachable to the screen. This embodiment is beneficial since it reduces complexity in terms of adjustability and causes less costs due to less complex screen design.

Figures 8, 9:
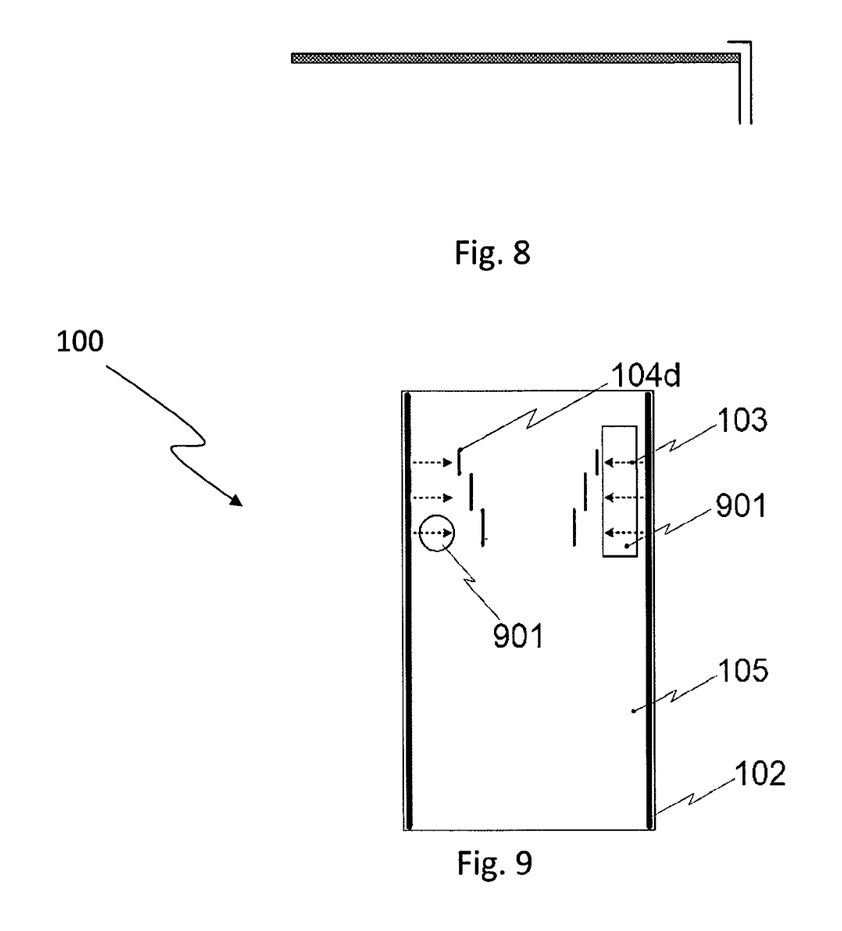

FIG. 8 shows a preferred case when the venting or display unit is turned off respectively is deactivated respectively when the car AC or air ventilation is turned off. The deflection means are preferably not visible any more in that case. The deflection means, in particular the microfluidic bumps, are preferably flattened.

FIG. 9 shows a further example of an inventive display unit 100. However, deflection means, in particular microfluidic bumps, are preferably mostly or fully transparent but they are not completely invisible and may moderately disturb pictures on the screen. Also they are preferably completely suitable with capacitive touch, but it can annoy user during touch screen usage.

Figure 10:
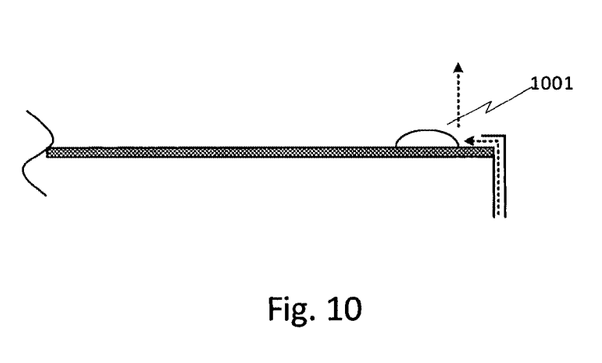
FIG. 10 shows schematically a cross sectional view of the inventive display unit in a specific situation of use.

FIG. 10*a* shows an arrangement in which the deflection means 1001 is preferably attached to the screen surface. The deflection means 1001 is preferably shaped as longitudinal object. The deflection means 1001 preferably extends along respectively adjacent to the frame 102 or conducting means. The deflection means 1001 preferably extends parallel to the frame 102. The deflection means 1001 is preferably made of a transparent material. The deflection means is preferably arranged closer to the frame than to the center of the screen. The center of the deflection means is preferably arranged less than 50 mm or less than 40 mm or less than 30 mm or less than 20 mm or less than 15 mm away from frame 102.

Figure 11:
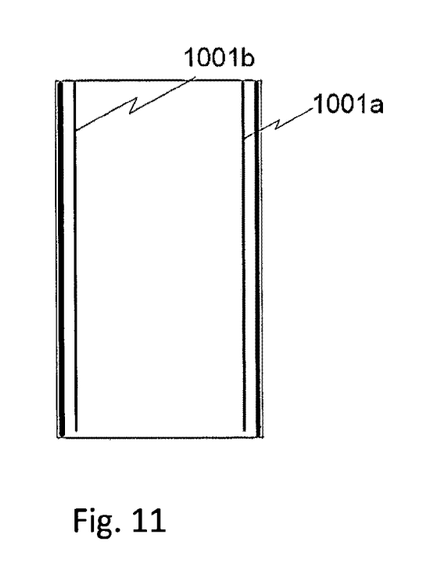
FIG. 11 shows a top view of an example of a display unit according to present invention.

FIG. 11 shows that a screen can be equipped with more than one deflection means 1001*a* and 1001*b*. Both deflection means 1001*a* and 1001*b* may have the properties of deflection means 1001 discussed with respect to FIG. 10.

Figure 12:
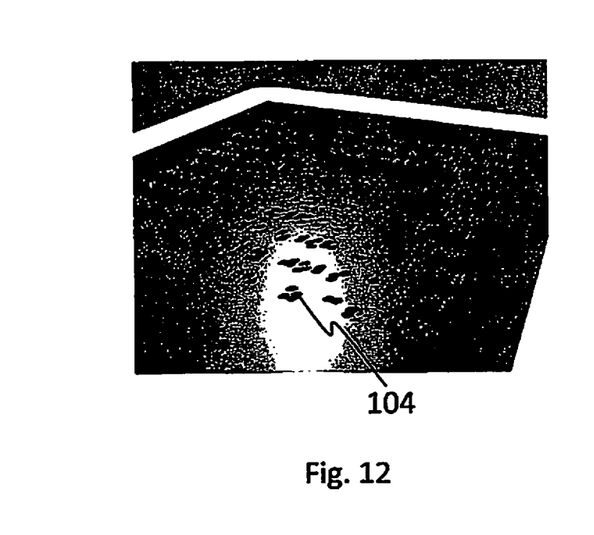
FIG. 12 shows a state of the art screen with deflections means that can be generated on demand.
Figure 13:
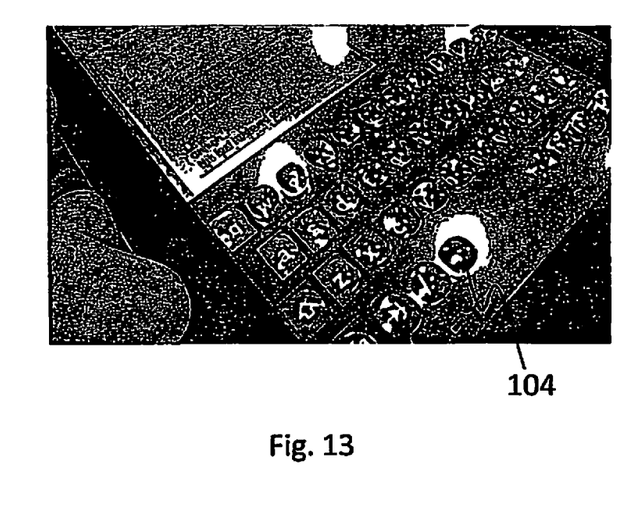
FIG. 13 shows a further state of the art screen having larger deflection means compared to those of FIG. 12.

FIGS. 12 to 13 are showing state of the art arrangements and helpful for a better understanding of the present invention.

Thus, in a further preferred embodiment, a control unit respectively system shifts critical control elements and critical information away from the position of the deflection means, in particular deflector bumps. That means, in case a deflector means becomes located at a location which is used as a functional section for inserting commands and/or which is used to display information the control unit detects that the deflection unit and that functional section are at the same location. The control unit than relocates the functional section to another section of the screen, which is not having a deflection unit.

The present invention therefore refers to a novel display unit. That display unit preferably comprises at least a screen for displaying visual information and an air conducting means for conducting air from a source to the screen, wherein the conducting means is configured to direct the air at least sectionaly along the screen. The display unit is characterized by at least one deflection means having a deflection surface for deflecting at least one part of the air directed at least sectionaly along the screen.

Thus, the present invention is concerning a display unit respectively an air vent solution, in particular a hidden air vent solution. The frames of the in-car-infotainment system are preferably elevated about a few millimeters, in particular like up to or at least 1 mm or up to or at least 2 mm or up to or at least 3 mm or up to or at least 4 mm or up to or at least 5 mm or up to or at least 6 mm or up to or at least 7 mm or up to or at least 8 mm or up to or at least 8 mm or up to or at least 9 mm or up to or at least 10 mm above the screen. The air is preferably sent aligned, in particular in a small angle or in parallel, to the surface of the screen. Preferably, transparent microfluidics, in particular forming the deflection means, are used on respectively underneath the screen surface to change the direction of the air flow. When air vent is off the deflection means, in particular microfluidics bumps, preferably disappear respectively preferably reduce its or their size. The deflection means, in particular microfluidic bumps, preferably occurred when air starts to flow or in dependency of a specific command inputted by a control unit or by a user. The size (height and/or width) and/or location and/or shape of the deflection means is preferably adjustable, in particular automatically or manually, in particular by interaction with the touch screen. Due to the size (height and/or width) and/or location and/or shape of the deflection means the air flow direction is adjustable. Deflection means, in particular microfluidics deflector bumps, are preferably nearly invisible (mostly transparent), when looked directly on it. Control methods are various but the deflection means, in particular the microfluidics deflector bumps, are preferably controlled electronically. Deflections can be done with any transparent material with fixed or adjustable height.

By this way e.g. a hidden air vent is created for especially large in-car-infotainment screens, but not limited to that.

| Reference numbers: | |
|---|---|
| 100 | Display unit |
| 101 | Air to cockpit |
| 102 | Elevated frame |
| 103 | Air flow directed inside frame |
| 104 | Microfluidic transparent deflector bump |
| 104a | Primary deflector bump |
| 104b | Secondary deflector bump |
| 104c | Nth deflector bump |
| 104d | Upper view of deflectors |
| 105 | Infotainment screen |
| 106 | Deformation means |
| 201 | Dashboard or dash |
| 202 | Cockpit |
| 401 | Possible air ventilation (AC) controls over touch screen |
| 501 | Adjustment of air canal |
| 502 | Adjustment of frame size |
| 503 | Adjustment of bump height |
| 504 | Adjustment of bump width |
| 601 | Alternative shapes (saw tooth) and alternative number of deflectors |
| 901 | Critical touch controls |
| 1001a&b | Microfluidic deflector bump along the screen |

The invention claimed is:

1. A display unit, comprising:
   a screen for displaying visual information;
   an air conducting means for conducting air from a source to the screen, wherein the air conducting means is configured to direct the air at least sectionaly along the screen;
   at least one deflection means having a deflection surface for deflecting at least one part of the air directed at least sectionaly along the screen;
   an air flow adjustment means for adjusting an air flow parameter, a flow direction, and/or a flow temperature; and
   a deformation means configured to form a size and/or shape and/or location of the at least one deflection means in dependency of a signal corresponding to an adjustment carried out by the air flow adjustment means or wherein the deformation means is actuatable by a deflection adjustment means for setting up or changing the size and/or the shape and/or the location of the at least one deflection means independently from the adjustment carried out by the air flow adjustment means.

2. The display unit according to claim 1,
wherein the deformation means is arranged underneath a section of a screen surface for transferring a part of the screen between a deflection state and a non-deflection state,
wherein the at least one deflection means is formable by a deformation of the screen surface caused by the deformation means,
wherein at least one part of the screen surface forms as the at least one deflection means with the deflection surface a peak in the deflection state, and
wherein in the non-deflection state the deformation of the screen surface is less compared with the deflection state.

3. The display unit according to claim 2,
wherein a number of the at least one deflection means can be set up or changed by the air flow adjustment means or the deflection adjustment means and/or the deformation means comprises at least one microfluidic, wherein the microfluidic can be transferred between at least two different locations, wherein a transfer of the microfluidic between the locations causes a change between the deflection state and the non-deflection state.

4. The display unit according to claim 1,
wherein the screen is a touch screen,
wherein the air flow adjustment means is at least visually displayable as a defined field on the touch screen and wherein adjustments can be made by inputting commands via that touch screen and/or
wherein the deflection adjustment means is at least visually displayable as a defined field on the touch screen and wherein adjustments can be made by inputting commands via that touch screen.

5. The display unit according to claim 2, wherein the air conducting means ejects an air flow in an angle lower than 30° with respect to a screen surface in the non-deflected state.

6. The display unit according to claim 1, wherein the air conducting means forms at least a slit or a tube like output opening adjacent to the screen surface,
wherein the screen surface defines a front side of the display unit,
and/or
wherein the air conducting means also forms an input opening,
wherein the input opening is arranged on a backside of the display unit,
wherein air is conductable by the air conducting means via the input opening and the output opening from the backside of the display unit to the front side of the display unit.

7. The display unit according to claim 6, wherein multiple output openings are arranged in the outer region of the screen surface and a corresponding number of deflection means are formable by the deformation means.

8. A dashboard comprising the display unit according to claim 1.

9. A vehicle comprising the display unit according to claim 1.

10. A method for deflecting air, comprising the steps:
providing the display unit according to claim 1;
causing air to be conducted by the air conducting means;
causing a deflection means to deflect at least one part of the conducted air;
controlling the air conducting means to direct the air to one of multiple sections of the screen surface;
at least one of: (i) causing the deformation means to form at least one deflection means in a path of the air flow; or (ii) causing the deformation means to form at least one deflection means: and
controlling the air conducting means to direct the air to the at least one deflection means formed by the deformation means.

11. The method according to claim 10, further comprising: causing a formation and/or a shape and/or a position of one or more deflection means in dependency of commands inputted by means of a touch screen.

12. The method according to claim 10, further comprising:
forming multiple deflection means in the path of the air flow,
wherein the deflection means are shaped differently.

13. A display unit comprising:
a screen for displaying visual information;
an air conducting means for conducting air from a source to the screen, wherein the air conducting means is configured to direct air at least sectionaly along the screen; and
at least one deflection means having a deflection surface for deflecting at least one part of the air directed at least sectionaly along the screen,
wherein a screen surface is shaped in such a manner that the deflection means is materialized permanently independently of a state selected by an air flow adjustment means, or the deflection means is reversely or non-reversely connected to the screen surface and the deflection means is at least transparent for light visible by humans.

* * * * *

UNITED STATES PATENT AND TRADEMARK OFFICE
CERTIFICATE OF CORRECTION

PATENT NO. : 11,230,166 B2
APPLICATION NO. : 16/315627
DATED : January 25, 2022
INVENTOR(S) : Ömür Öcal et al.

Page 1 of 1

It is certified that error appears in the above-identified patent and that said Letters Patent is hereby corrected as shown below:

On the Title Page (71) Applicant:
Replace "Vestel Elektronik Sanay ve Ticaret A. S., Manisa (TR)"
With --Vestel Elektronik Sanayi ve Ticaret A. S., Manisa (TR)--

Signed and Sealed this
Twenty-ninth Day of November, 2022

Katherine Kelly Vidal
*Director of the United States Patent and Trademark Office*